US005111530A

United States Patent [19]

Kutaragi et al.

[11] Patent Number: 5,111,530

[45] Date of Patent: May 5, 1992

[54] DIGITAL AUDIO SIGNAL GENERATING APPARATUS

[75] Inventors: Ken Kutaragi; Makoto Furuhashi, both of Kanagawa; Toshiya Ishibashi, Tokyo, all of Japan

[73] Assignee: Sony Corporation, Tokyo, Japan

[21] Appl. No.: 428,842

[22] Filed: Oct. 30, 1989

[30] Foreign Application Priority Data

| | | | |
|---|---|---|---|
| Nov. 4, 1988 | [JP] | Japan | 63-278721 |
| Nov. 10, 1988 | [JP] | Japan | 63-284246 |
| Nov. 16, 1988 | [JP] | Japan | 63-289831 |

[51] Int. Cl.[5] .......... G10L 5/00; G06F 7/00; G06F 15/00

[52] U.S. Cl. .......... 395/20; 381/51; 381/63; 84/708

[58] Field of Search .......... 381/51-53, 381/63; 364/513.5; 84/708

[56] References Cited

U.S. PATENT DOCUMENTS

| | | | |
|---|---|---|---|
| 3,866,505 | 2/1975 | Adachi | 84/708 |
| 4,586,417 | 5/1986 | Kato | 381/63 |

FOREIGN PATENT DOCUMENTS

| | | |
|---|---|---|
| WO80/01421 | 7/1980 | PCT Int'l Appl. . |
| 1312410 | 4/1973 | United Kingdom . |
| 1520484 | 8/1978 | United Kingdom . |
| 1572426 | 6/1980 | United Kingdom . |

*Primary Examiner*—E. S. Kemeny
*Attorney, Agent, or Firm*—Philip M. Shaw, Jr.

[57] ABSTRACT

A digital audio signal generating apparatus suitable for the application to electronic musical instruments, sound effect generators for amusement machines and the like. This digital audio signal generating apparatus has a signal processing section and a memory used to perform a speech synthesis, wherein the signal processing section utilizes a vacant area of the memory to perform a delay processing to add a reverberation sound. Thus, the number of required memories can be reduced and the arrangement of the apparatus can be simplified.

4 Claims, 11 Drawing Sheets

(Voice #A)

(Voice #B)

(Voice #C)

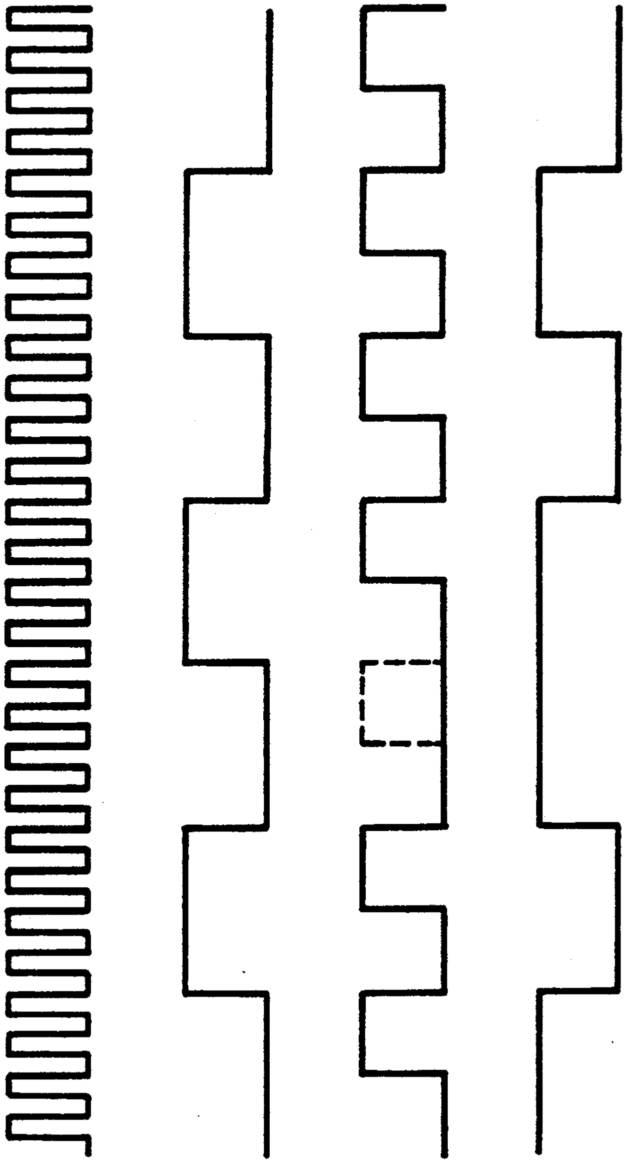
FIG. 11A DSP Clock
FIG. 11B Time-Division Signal
FIG. 11C CPU Clock
FIG. 11D CPU Machine Cycle

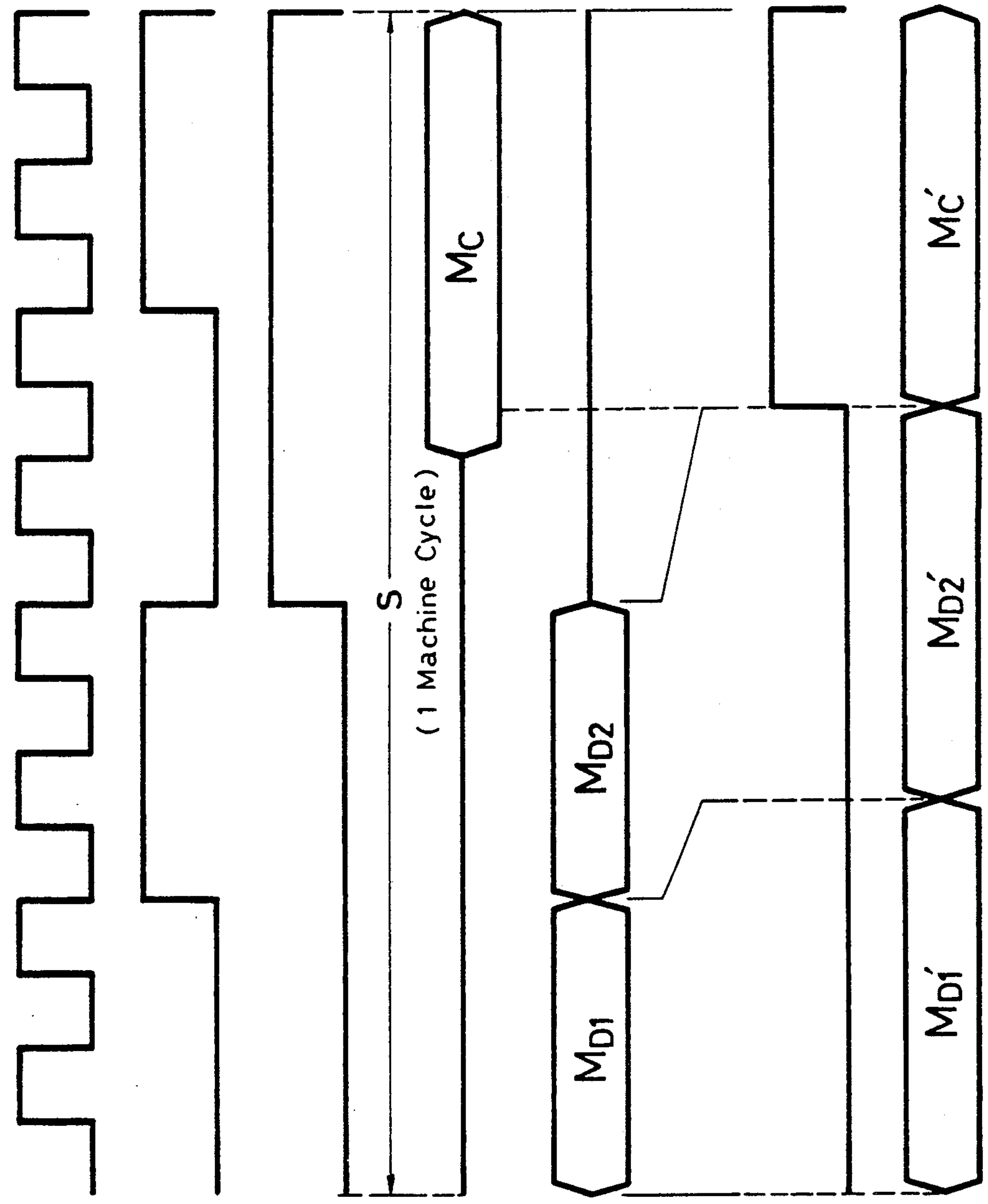
FIG. 12A DSP Clock
FIG. 12B CPU Clock
FIG. 12C Time-Division Signal
FIG. 12D CPU Memory Access
FIG. 12E DSP Memory Access
FIG. 12F Switch Change-Over
FIG. 12G Access Change-Over

DIGITAL AUDIO SIGNAL GENERATING APPARATUS

BACKGROUND OF THE INVENTION

1. Field of the Invention

This invention relates generally to apparatus for generating a digital audio signal and, more particularly, is directed to a digital audio signal generating apparatus suitable in the application to electronic musical instruments, a sound effect generator for amusement machines and the like.

2. Description of the Prior Art

As a sound source for electronic musical instruments or a sound effect sound source for amusement machines, the following one is proposed in the prior art. According to this previously-proposed sound source, a rectangular wave signal, for example, is supplied to a plurality of preset frequency dividers each having different frequency-dividing ratio and different duty ratio. Sound source signals (i.e. so-called voices) from the respective frequency dividers are synthesized in a proper level. In that case, the original oscillation waveform may be a triangular wave, a sinusoidal wave or the like.

In some musical instruments such as piano and drums, the total sound generating period is divided to provide 4 intervals such as attack period, decay period, sustain period and release period, and the amplitude (level) of the signal in each interval presents a peculiar changed condition. Accordingly, a so-called ADSR (attack, decay, sustain, release) control is performed so as to cause the signal level of each voice to be changed similarly.

On the other hand, as a sound source for musical instruments, a so-called FM sound source is known, in which a sine wave signal is frequency-modulated (FM) by a sine wave signal having a low frequency. According to this FM sound source, a modulation factor is made as a function of time and various kinds of sound signals (sound signal means an audio signal in this specification) can be obtained by the lesser sound source. The sound effect sound source may be a noise component (i.e. white noise component and the like).

In order to obtain real sounds of various musical instruments by using the afore-mentioned so-called electronic sound source, very complex signal processing is required and hence, the circuit scale of the audio signal generating apparatus is made large.

To solve the above-mentioned problem, recently, a so-called sampler sound source is proposed, in which real sounds of various musical instruments are digitally recorded, written in a memory (ROM) and a signal of a predetermined musical instrument is read from this memory.

In this sampler sound source, in order to save the storage capacity of the memory, the digital audio signal is data-compressed and written in the memory, while the compressed digital signal read from the memory is data-expanded and is re-converted to the original digital sound signal. In this case, only a signal of sound having particular is written in the memory for each musical instrument, and the signal read from the memory is pitch-converted to generate a fundamental frequency signal of sound having a desired pitch and loudness.

Further, a signal waveform, appearing in the initial stage of sound generation and peculiar to each musical instrument, is directly written in the memory and is read out of the memory. This signal waveform is what might be called a formant, and the formant means, in the case of, for example, piano, a sound such as an operation sound and the like generated when the pianist touches a keyboard of the piano to cause a hammer to strike a key. In that case, a repetitive waveform portion of a fundamental cycle is written in the memory for only one cycle and is repeatedly read from the memory.

More specifically, upon reproduction, as shown in FIG. 1, subsequent to a formant component a of short time period, a fundamental frequency signal component b, which is formed of repetitive waveforms p, is obtained and thus a sound of a desired musical instrument can be obtained. In that event, in the case the sound of a piano or the like, the natural sound of the musical instrument can be reproduced by gradually decreasing the level of the waveform p in accordance with a predetermined rule.

According to the above-mentioned musical instruments if a reverberation sound or the like is added to the reproduced musical instrument sound, then it will be possible to reproduce sounds of various tones. In particular, when a digital audio signal generating apparatus is employed as the sound effect generating apparatus for amusement machines, it is frequently requested to add the reverberation sound to the reproduced sound in order to gain presence satisfactorily.

When the reverberation sound is added to the digital audio signal, however, the digital audio signal is temporarily stored in a memory such as a random access memory (RAM) or the like and is delay-processed by this memory, thereby generating a reverberation sound. This requires a memory of large storage capacity in which the digital audio signal is stored, which fact makes the apparatus complicated in arrangement.

Further, according to the previously-proposed reverberating apparatus, when control data from a central processing unit (CPU) is not defined because the power switch of the apparatus is just turned ON, a delay processing area is erroneously set in the sound source data writing area of the memory, which causes the apparatus to malfunction.

Further, when the FM operation is performed in order to gain various sounds in the sampler sound source, a signal source for frequency-modulation is required, which causes the circuit arrangement to become complicated.

Furthermore, when an amplitude-modulation (AM) is performed in order to achieve performance effect, there is then presented a similar problem.

In addition, the memory which temporarily stores the sound source data and the control program required for processing the sound source data must have a relatively large storage capacity, which unavoidably causes the circuit arrangement to become complicated.

OBJECTS AND SUMMARY OF THE INVENTION

Accordingly, it is an object of the present invention to provide an improved digital audio signal generating apparatus which can eliminate the defects encountered with the prior art.

More specifically, it is an object of the present invention to provide a digital audio signal generating apparatus of simplified arrangement which can add a reverberation sound to a sound without providing a special memory.

It is still another object of the present invention to provide a digital audio signal generating apparatus of simplified arrangement in which addition of echoes to many voices can be stably and positively performed without a special memory.

It is still another object of the present invention to provide a digital audio signal generating apparatus which can perform frequency-modulation and amplitude-modulation without a special signal source required by the frequency-modulation and the amplitude-modulation.

It is a further object of the present invention to provide a digital audio signal generating apparatus in which the number of necessary memories can be reduced by utilizing more effectively a temporarily-storage memory required when data such as sound source data or the like are processed.

According to an aspect of the present invention, there is provided an apparatus for generating a digital audio signal comprising:

memory means for storing a digital audio signal;

control means for controlling a reading of the digital audio signal from the memory means;

signal processing means for performing a predetermined processing, including reverberation processing, of the digital audio signal read by the control means;

temporary memory means used by both the control means and the signal processing means; and means for setting a delay area in vacant areas of the temporary memory means so as to perform a delay processing when a reverberation sound is added to the digital audio signal processed by the signal processing means.

According to a preferred embodiment of the invention, means are provided for inhibiting an operation of the delay area setting means, wherein the vacant area can be prevented from being inadvertently provided in the memory means.

Furthermore, a plurality of digital audio signals read from the memory means are separately processed through a plurality of pitch converting means. Means are provided for supplying the output of one of the pitch converting means to another pitch converting means as a control signal, wherein a frequency-modulated digital audio signal is generated from the other pitch converting means.

In the preferred embodiment, the signal processing means has a first execution cycle to execute its operations and for writing in and reading out data from the temporary memory means. The control means has a second execution cycle different from the first execution cycle to execute its operation and for writing in and reading out data from the temporary memory means. Further included are selecting means for selectively connecting one of the signal processing means or the control means to the temporary memory means so that data is written in and/or read from the temporary memory means by one of the signal processing means or the control means. Selecting control means control the selecting means so that data can be written in and/or read from the temporary memory means by the control means during a non-access period in which data is not written in and/or read from the temporary memory means by the signal processing means. Holding means provided between the control means and the temporary memory means hold data so that a period in which the control means writes in and/or reads data from temporary memory means substantially coincides with the non-access period.

These, and other objects, features and advantages of the present invention, will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIGS. 11A-11D are timing charts to which reference will be made in explaining the operation of the synchronizing circuit of FIG. 10, respectively; and FIGS. 12A-12G are timing charts to which reference will be made in explaining the timing at which an external random access memory should be controlled.

DETAILED DESCRIPTION OF PREFERRED EMBODIMENTS

Figure 1:
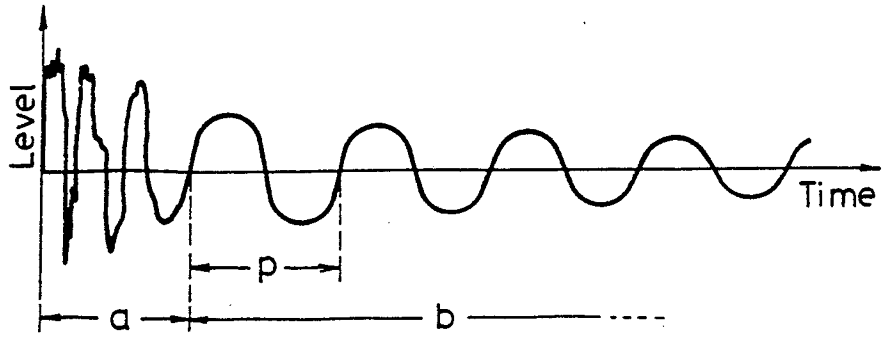
FIG. 1 is a waveform diagram to which reference will be made in explaining a reproducing operation of musical instrument sound.

An apparatus for generating a digital audio signal according to an embodiment of the present invention will hereinafter be described with reference to FIGS. 2 to 5.

Referring to the drawings, and initially to FIG. 4, a general or overall arrangement of the embodiment of the present invention will be explained hereinbelow.

Figure 4:
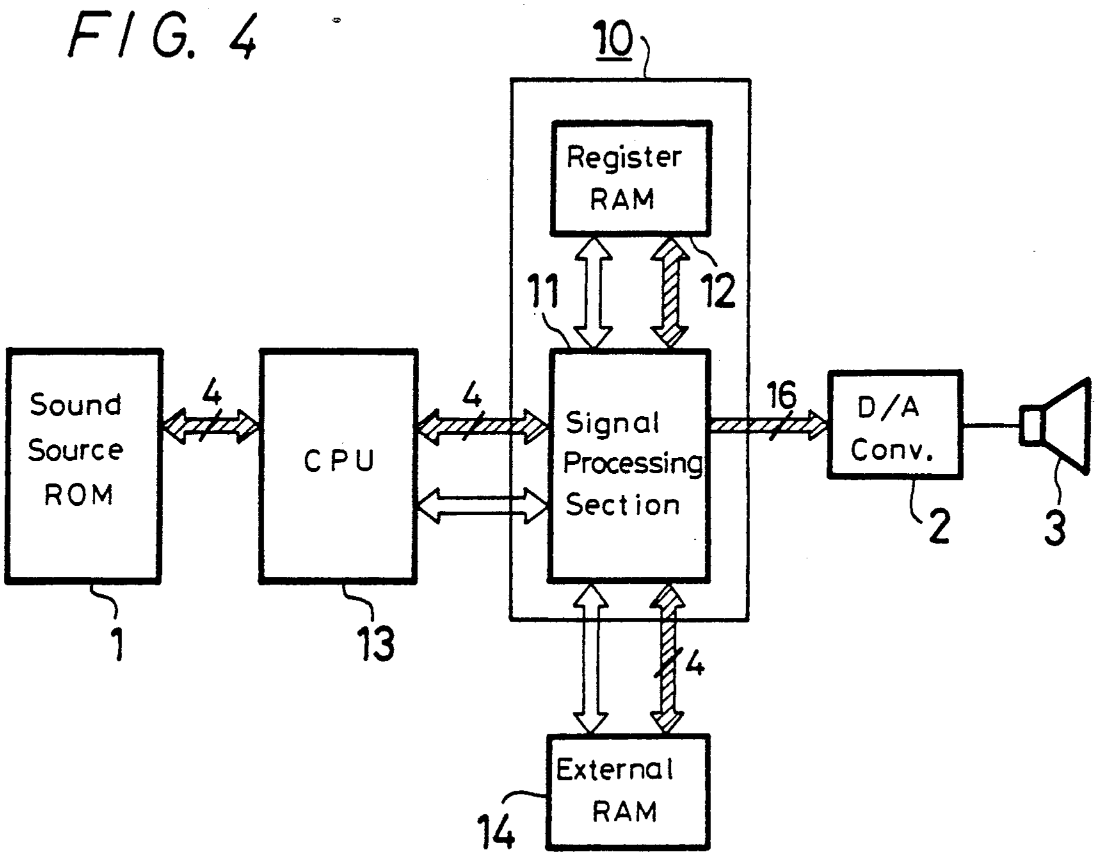
FIG. 4 is a schematic block diagram showing a general or overall arrangement of one embodiment of the present invention.

Referring to FIG. 4, there is shown a sound source read only memory (ROM) such as a ROM cartridge or the like provided outside of the apparatus. In this sound source ROM 1, sound data of, for example, 16 bits, which are generated from various musical instruments and digitally recorded as mentioned before, are reduced in bit rate to, for example, 4 bits (i.e. BRR-encoded) and stored in block. In this embodiment, musical instrument tones such as the tone of a piano and so on are separately memorized (stored) in the form of a non-interval component called a formant component in the early stage of sound generation and an interval component which is a fundamental frequency signal of one cycle amount of sound of particular loudness.

In FIG. 4, reference numeral 10 generally designates a digital signal processing apparatus (DSP) which is provided as an electronic musical instrument. This digital signal processing apparatus 10 includes a signal processing section 11 and a register random access memory RAM 12. From all of the sound data from various kinds of sound sources stored in the ROM 1, a desired sound data is transferred through the signal processing section 11 to an external RAM 14 under the control of a central processing unit (CPU) 13. This external RAM 14 has a storage capacity of, for example, 64 kilo bytes and stores therein, in addition to the sound source data, program of CPU 13 and delay data used for reverberation sound addition processing. They are respectively used in a time-division manner upon use. Similarly, the register RAM 12, which stores various control data and so on, is made operable by both of the signal processing section 11 and the CPU 13 in a time-division manner.

The sound source data read from the external RAM 14 is decoded to the original sound source data by the BRR decoding-processing which is opposite to the afore-mentioned BRR encoding-processing. If necessary, the decoded original sound source data undergoes various data processings such as the above-mentioned ADSR-processing, pitch-conversion processing and the like. The digital audio signal thus processed is supplied to a digital-to-analog (D/A) converter 2, in which it is converted to an analog audio signal and is fed to a speaker 3.

The arrangement of a main component of one embodiment of the present invention will be explained with reference to FIGS. 2A, 2B and 3.

In this embodiment, 8 voices of #A, #B, . . . , #H are synthesized or mixed and outputted as left and right-two channel digital audio signals. The digital audio signals of the respective voices and the respective channels are computed in a time-division manner. In order to gain a better understanding of the present invention, imaginary hardware of the same arrangement are prepared for each voice and each channel in FIGS. 2 and 3.

Figure 2A:
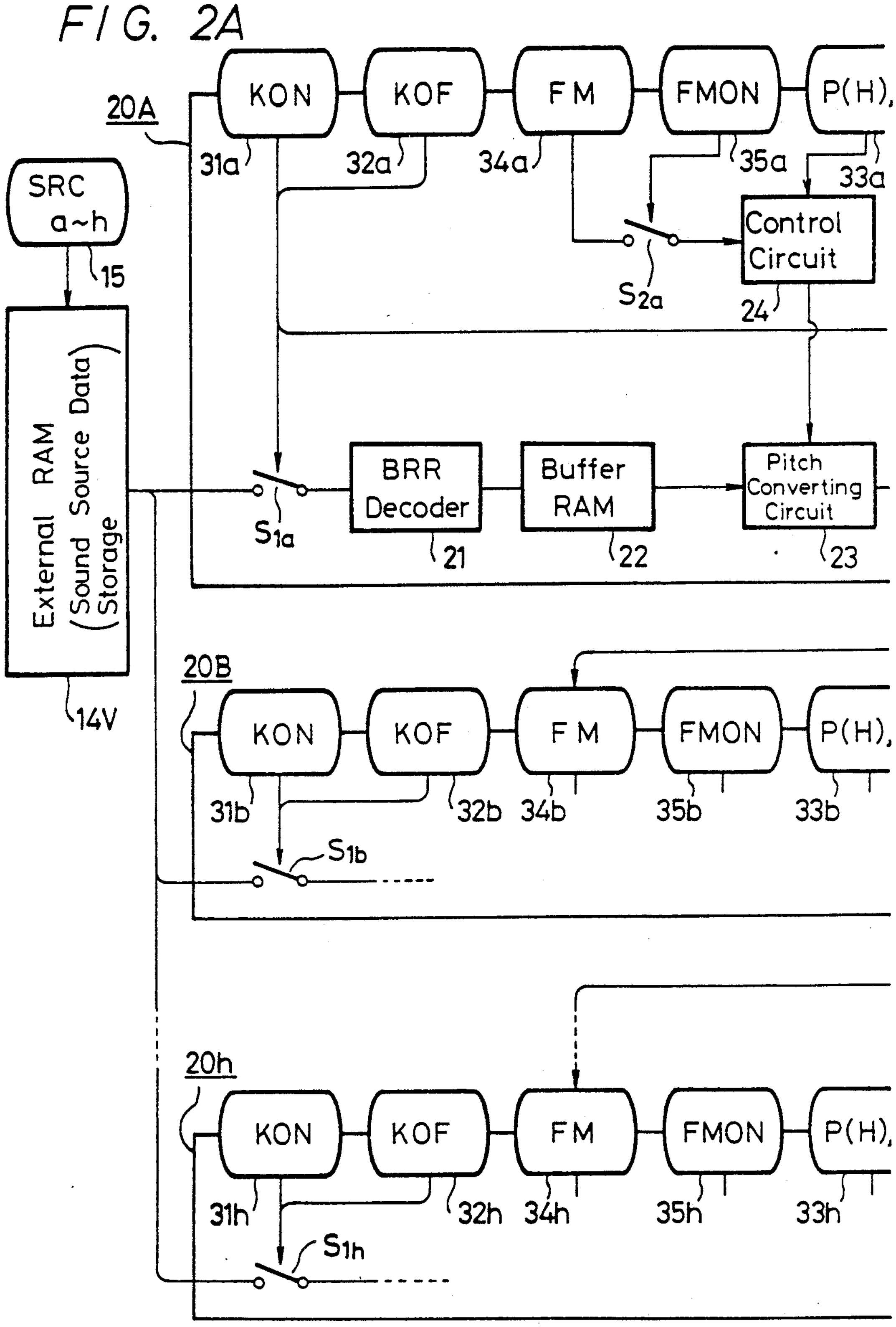
FIGS. 2A and 2B as well as FIG. 3 are schematic block diagrams each showing a main portion of the digital audio signal generating apparatus according to an embodiment of the present invention.
Figure 2B:
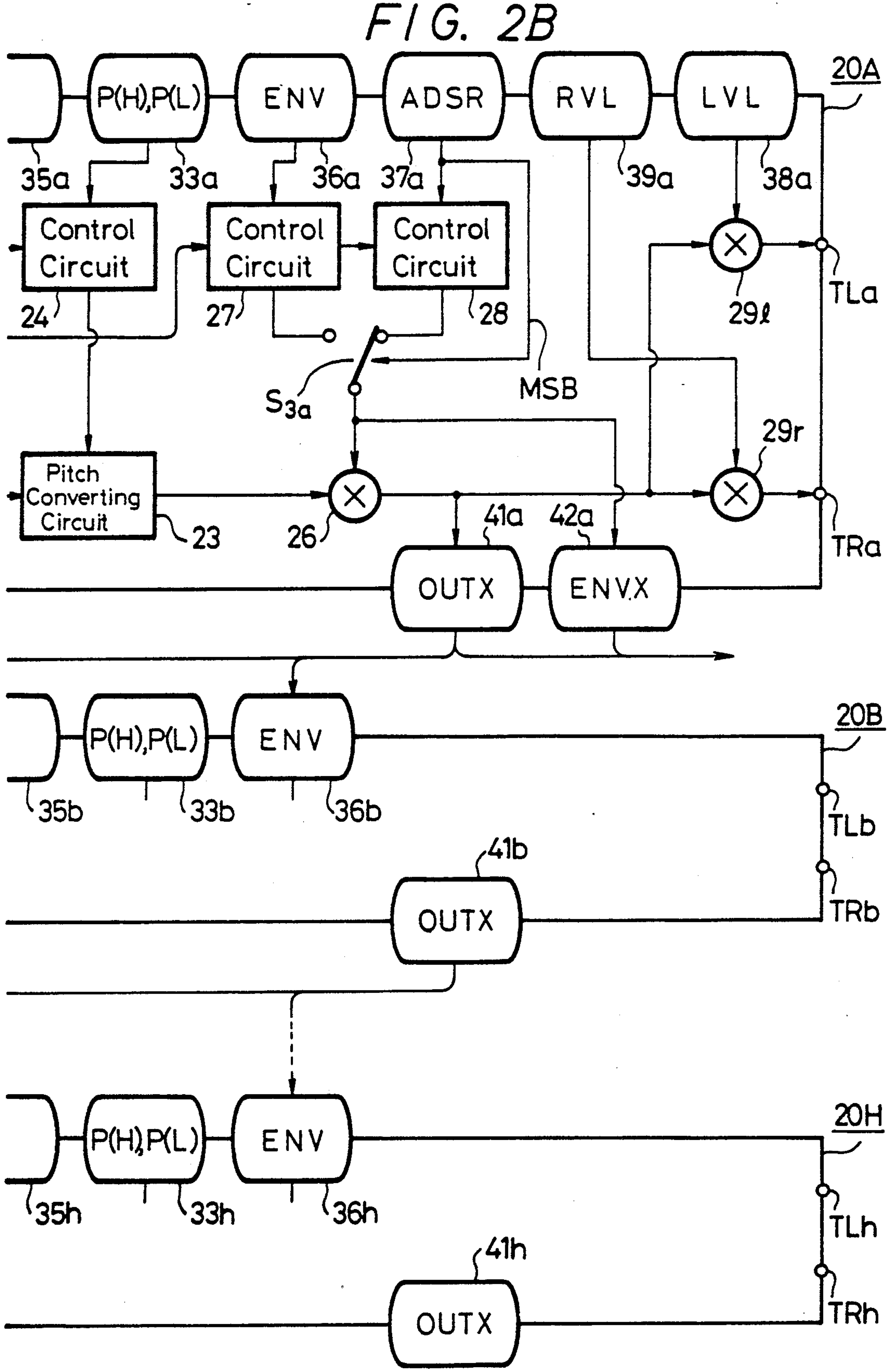

In FIG. 2 (formed of FIGS. 2A and 2B to permit a use of a suitably large scale), reference numerals 20A, 20B, . . . , 20H respectively designate signal processing sections for voices #A, #B, . . . , #H. These signal processing sections 20A, 20B, . . . , 20H are each supplied with desired sound source data which are read from a sound source data storage section 14V in response to sound source selecting data $SRC_a$ to $SRC_h$ supplied to a terminal 15 of the external RAM 14. In this embodiment, the sound source data storage section 14V designates an area of the external RAM 14 in which there are written the sound source data and the program data of the CPU 13.

When musical instrument tones, independently stored in the sound source ROM 1 in the form of the non-interval (i.e. formant) component and the interval component, are reproduced, data of the non-interval component is supplied to the signal processing portion 20A of, the voice #A. The data of the interval component, however, is supplied to the signal processing sections 20B to 20H of the other voices under control of control data which will be explained later.

The sound source data supplied to the signal processing section 20A is supplied through a switch $S_{1a}$ to a BRR decoder 21, in which it is data-expanded as set forth above and is fed through a buffer RAM 22 to a pitch converting circuit 23. The switch $S_{1a}$ is opened and/or closed in response to control data KON (key ON) and KOF (key OFF) supplied thereto from the register RAM 12 (see FIG. 4) through terminals 31*a* and 32*a*. The pitch converting circuit 23 is supplied with pitch control data P(H) and P(L) from the register RAM 12 through a control circuit 24 for computing parameters or the like and a terminal 33*a*. The control circuit 24 is also supplied with a signal such as another voice #H through a terminal 34*a* and a switch $S_{2a}$. The switch $S_{2a}$ is controlled in its connected state in response to control data FMON (FM ON) from the register RAM 12 through a terminal 35*a*.

The output of the pitch converting circuit 23 is supplied to a multiplier 26 and the multiplier 26 is supplied with control data ENV (envelope-control) and ADSR (ADSR-control) from the register RAM 12 through terminals 36*a* and 37*a* and control circuits 27 and 28, respectively, and a change-over switch $S_{3a}$. The change-over switch $S_{3a}$ is changed in position in response to the most significant bit (MSB) of the control data ADSR.

When a noise is used as the effect sound source, an output of, for example, an M-series noise generator, though not shown, is employed instead of the output of the pitch converting circuit 23, and is then fed to the multiplier 26.

The output of the multiplier 26 is commonly supplied to second and third multipliers 29*l* and 29*r*, and control data LVL (left sound volume) and control data RVL (right sound volume) from the register RAM 12 are supplied to the multipliers 29*l* and 29*r* via terminals 38*a* and 39*a*, respectively.

An instantaneous value OUTX of the output of the multiplier 26 is supplied to the register RAM 12 through a terminal 41*a*, and is also supplied to a terminal 34*b* of the signal processing section 20B. A peak value ENVX of the output of the switch $S_{3a}$ is supplied to the register RAM 12 via a terminal 42*a*. Further, an output at the terminal 41*a* of the signal processing section 20A may be supplied to a terminal 36*b* of the signal processing section 20B as shown by a broken line in FIG. 2B.

Tables 1 and 2 illustrate maps of control data for the register RAM 12.

TABLE 1

| Address | Register | |
|---|---|---|
| 00 | | LVL |
| 01 | | RVL |
| 02 | | P(L) |
| 03 | | P(H) |
| 04 | Voice #A | ADSR(1) |
| 06 | | ADSR(2) |
| 07 | | SRC |
| 08 | | ENVX |
| 09 | | OUTX |
| 10~19 | Voice #B | |
| 20~29 | Voice #C | |
| 30~39 | Voice #D | |
| 40~49 | Voice #E | |
| 50~59 | Voice #F | |
| 60~69 | Voice #G | |
| 70~79 | Voice #H | |

TABLE 2

| Address | Register | |
|---|---|---|
| 0C | | NON |
| 1C | | KOF |
| 2C | | FMON |
| 3C | NON | (Noise ON) |
| . | | . |
| . | | . |
| . | | . |

TABLE 2-continued

| Address | | Register |
|---|---|---|
| 0D | | MVL(L, R) |
| 1D | | EVL(L, R) |
| 2D | | EDL |
| 3D | | EFB |
| 4D | | EON |
| 5D | | ESA |
| . | | . |
| . | | . |
| . | | . |
| 0F~7F | $C_0 \sim C_7$ | (Coefficients) |

The control data of the table 1 are prepared for each voice, and the control data of the table 2 are commonly prepared for 8 voices. The control data below the address 0D are associated with a block diagram forming FIG. 3 which will be explained below. Each of the registers of the tables 1 and 2 is of an 8-bit register.

Figure 3:
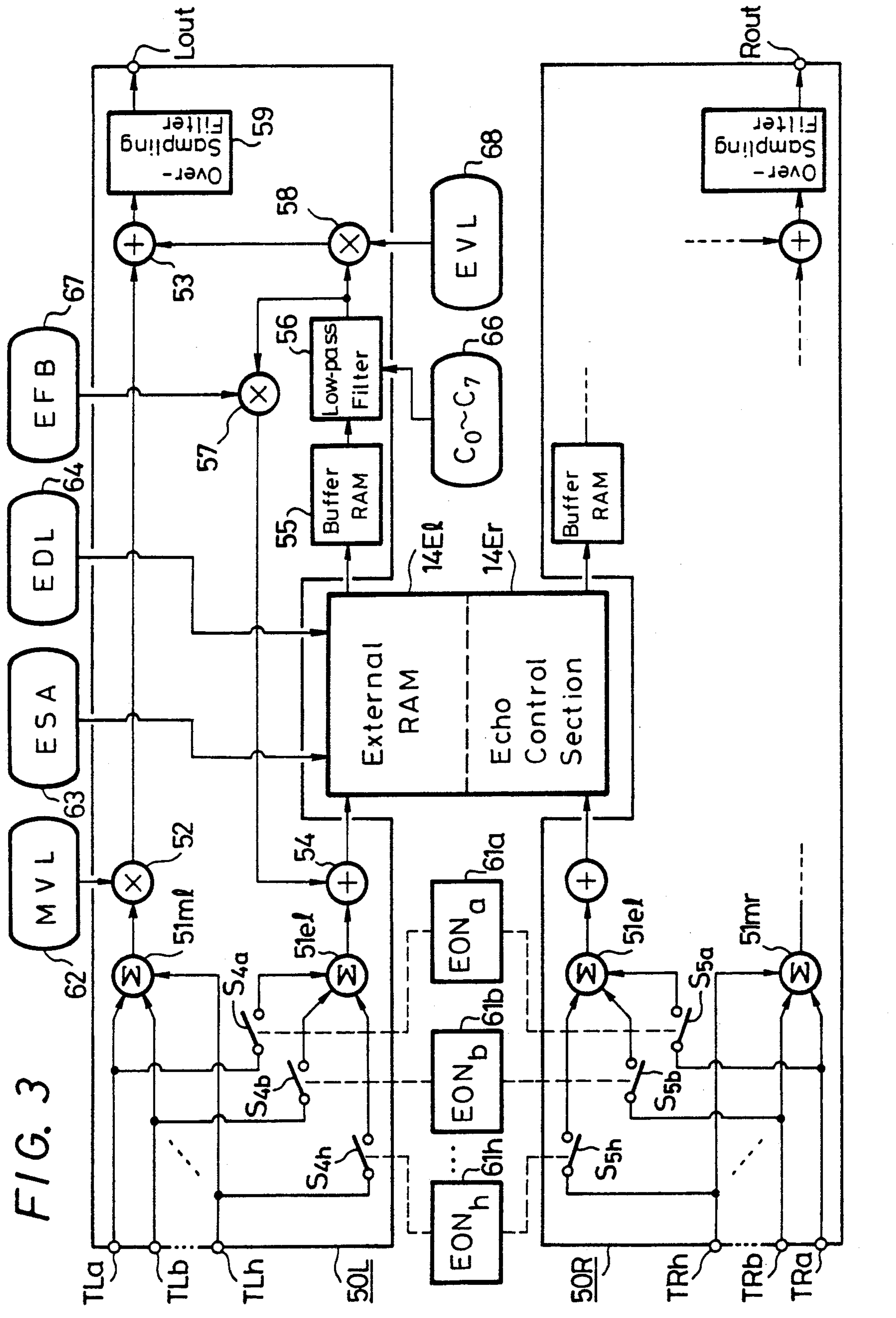

Referring to FIG. 3, there are provided left-channel and right-channel signal processing sections 50L and 50R, respectively. The output of the second multiplier 29*l* of the signal processing section 20A of FIG. 2B is directly supplied to a main adder 51*ml* of the left-channel signal processing section 50L through a terminal TLa, and is also fed to a sub-adder 51*el* through a switch $S_{4a}$. The output of the third multiplier 29*r* is directly supplied to a main adder 51*mr* of the right-channel signal processing section 50R through a terminal TRa and is also supplied to a sub-adder 51*er* through a switch $S_{5a}$. Similarly, the respective outputs of the signal processing sections 20B to 20H of the voices #B to #H are supplied to adders 51*ml*, 51*el* and 51*mr*, 51*er* of the left-channel and right-channel signal processing sections 50L and 50R.

Switches $S_{4a}$, $S_{5a}$; $S_{4b}$, $S_{5b}$, . . . , $S_{4h}$, $S_{5h}$, corresponding to the same voices of both signal processing sections 50L and 50R are each opened and/or closed in a ganged relation in response to control data EONa (echo-ONa), EONb, . . . , EONh supplied thereto from the register RAM 12 through terminals 61*a*, 61*b*, . . . , 61*h*.

In that event, when the signal processing of the above-mentioned non-interval component is performed by the signal processing section 20A of the voice #A, the switches $S_{4a}$ and $S_{5a}$ are controlled so as not to close, thereby preventing a reverberating sound (echo) from being added to the non-interval component.

The output of the main adder 51*ml* is supplied to a multiplier 52, and a control data MVL (main sound volume) from the register RAM 12 is supplied to the multiplier 52 via a terminal 62. The output of the multiplier 52 is supplied to an adder 53.

The output of the sub-adder 51*el* is supplied through an adder 54, a left-channel echo control section 14El of the external RAM 14 and a buffer RAM 55 to a digital low-pass filter 56 such as a finite impulse response (FIR) filter. The echo control section 14El is supplied with control data ESA (echo start address) and EDL (echo delay) from the register RAM 12 through the terminals 63 and 64.

Figure 5:
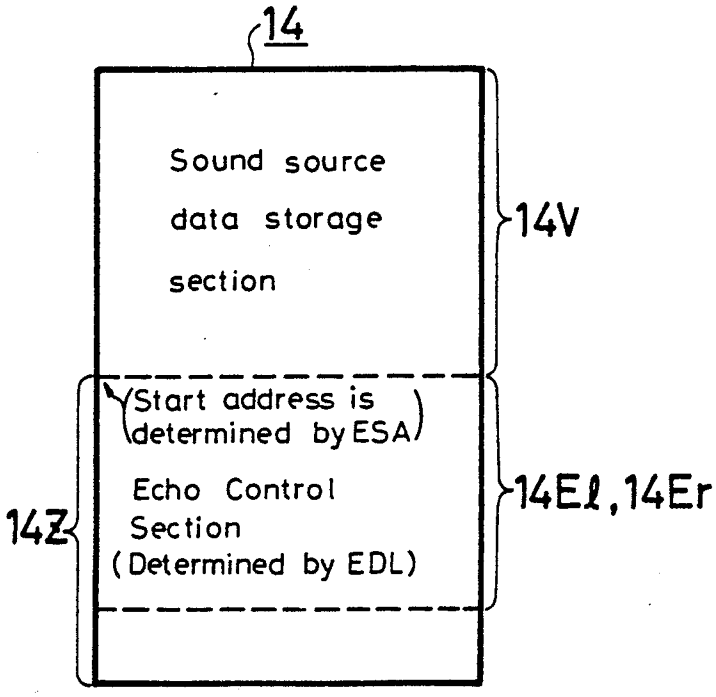
FIG. 5 is a schematic diagram of an example of a random access memory as used in one embodiment of the present invention.

In this embodiment, the left-channel and right-channel echo control sections 14El and 14Er are provided within the external RAM 14, if necessary. More specifically, as shown in FIG. 5, the storage capacity of a sound source data storage section 14V of the external RAM 14 changes with the sound source to be employed. As a result, a vacant area 14Z in which there are stored no sound source data and control data is produced depending on the using condition. In that event, the left-channel and right-channel echo control sections 14El and 14Er are set within the vacant area 14Z. Start addresses of the echo control sections 14El and 14Er are determined by the control data ESA, and the amount of addresses in which the echo control sections 14El and 14Er follow from the start address is determined by the control data EDL. If the address amount is sufficient, then the delay amount will be increased and the reverberation time will be increased.

Referring back to FIG. 3, the low-pass filter 56 is supplied with coefficient data $C_0$ to $C_7$ from the register RAM 12 through a terminal 66. The output of the low-pass filter 56 is fed through a multiplier 57 back to the adder 54, and is also supplied to a multiplier 58. The multipliers 57 and 58 are supplied with control data EFB (echo feedback) and EVL (echo sound volume) from the register RAM 12 through terminals 67 and 68, respectively. The output of the multiplier 58 is supplied to the adder 53, in which it is mixed with the output of the main adder 51*ml* through the multiplier 52, and the mixed output is delivered through an over-sampling filter 59 to an output terminal Lout.

The external RAMs 14El and 14Er of FIG. 3 constitute one portion of the external RAM 14 of FIG. 4 similarly to the external RAM 14V of FIG. 2A so that the signals are inputted and/or outputted for each voice and each channel in a time-division manner. Further, the buffer RAM 22 of FIG. 2A and the buffer RAM 55 of FIG. 3 are also operated in a time-division manner similarly as described above.

The operation of one embodiment of the present invention will be explained hereinafter.

The sound source data storage section 14V stores therein sound source data of various musical instruments such as piano, saxphone, cymbals and the like. In this case, the above-mentioned sound source data are assigned numbers 0 to 255, while sound source data having the non-interval component such as piano and the like are stored in the storage section 14V so as to have numbers different from those of the non-interval component and the interval component. Eight sound source data, selected by the sound source selecting data $SRC_a$ to $SRC_h$ are processed by the signal processing sections 20A to 20H of respective voices in a time-division manner.

In this embodiment, a sampling frequency fs is selected to be, for example, 44.1 kHz and computing processings of, for example, 128 cycles in total are performed in 8 voices and 2 channels within one sampling cycle (1/fs). One computing cycle is, for example, 170 nanoseconds.

In this embodiment, unlike the ordinary operation, switches $S_{1a}$ to $S_{1h}$ indicating the sound start (key ON) and sound stop (key OFF) of respective voices are controlled by use of different flags. In other words, the control data KON (key ON) and KOF (key OFF) are respectively prepared. Both control data are 8 bits and are written in separate registers, and bits $D_0$ to $D_7$ of each control data correspond to key ON and key OFF of each of the voices #A to #H.

Therefore, the user (musical software producer) may set flag "1" only in the voice which the user wants to key ON or key OFF, so that the user is free from the cumbersome work of making a program in which bits, not changed at every individual musical note, are temporarily written in a buffer register.

Figure 6A:
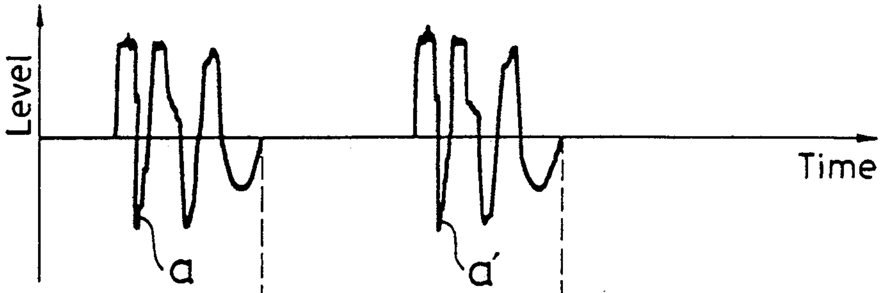
FIGS. 6A-6C are waveform diagrams of frequencies to which reference will be made in explaining the operation of the apparatus of this invention.
Figure 6B:
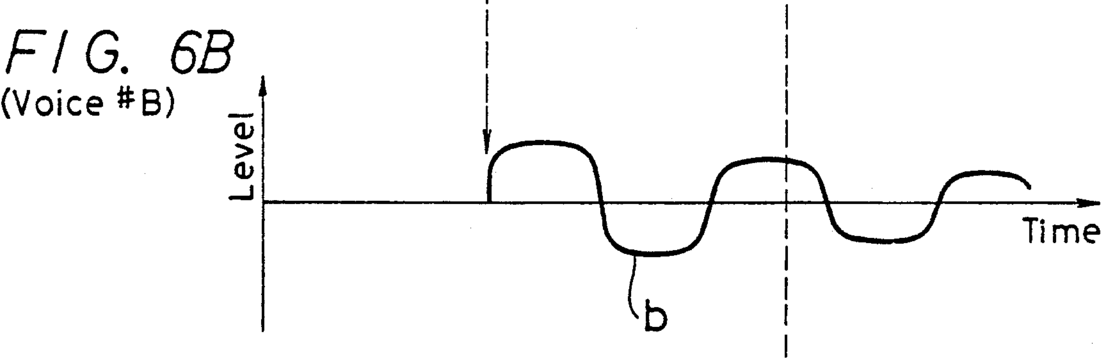

In this embodiment, when the sound source data, separated in the form of the non-interval component and the interval-component, are reproduced, the non-interval component data is read from the RAM 14V and the switch $S_{1a}$ of the signal processing section 20A of the voice #A is controlled to process the non-interval component a in the voice #A as shown in FIG. 6A. When the data of the non-interval component a are fully read from the RAM 14V, data of one cycle of the succeeding interval component is repeatedly read, and one of the switches $S_{1b}$ to $S_{1h}$ of any one of the vacant signal processing sections 20B to 20H of voices #B to #H is controlled to signal-process the interval component of any one of the voices #B to #H. Assuming that the signal processing section 20B of voice #B is vacant, then the interval component b succeeding to the non-interval component a will be signal-processed by the signal processing section 20B as shown in FIG. 6B. In that event, the interval component b is converted to data of a predetermined pitch by the pitch converting circuit 23.

Figure 6C:
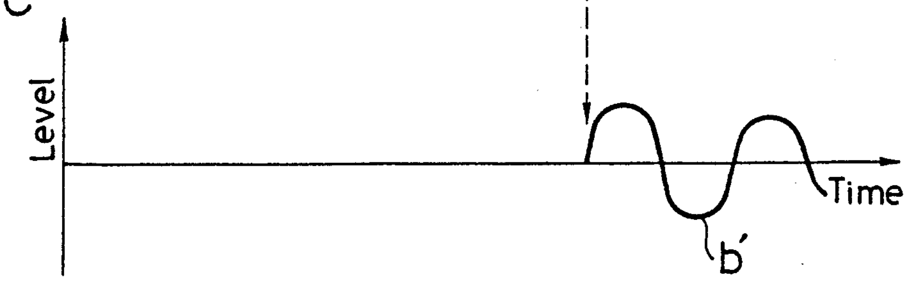

When sounds of different loudnesses derived from the same musical instrument are reproduced as an overlapped sound while the musical instrument tone formed of the non-interval component a and the interval component b is reproduced, as shown in FIG. 6A, the non-interval component a' similar to the non-interval component a is read from the RAM 14V, and is processed by the signal processing section 20A of the voice #A. In that event, the interval component b is being processed by the signal processing section 20B of the voice #B so that an interval component b' succeeding to the non-interval component a' is processed by the signal processing section of another vacant voice, for example, the signal processing section 20C of voice #C as shown in FIG. 6C. In that case, the interval component b' is converted to an interval component different from the interval component b by the pitch converting circuit 23. Then, the respective sounds are added by the main adders 51*ml* and 51*mr* or sub-adders 51*el* and 51*er* of the left-channel and right-channel signal processing sections 50L and 50R and are reproduced as a double sound.

In this embodiment, 8 voices of #A to #H are processed in a time-division manner so that the pitch converting circuit 23 performs the interpolation computing, i.e. over-sampling on the basis of input data of the preceding and succeeding 4 samples. Thus the pitch conversion is performed at the same sampling frequency fs as that used for the input data. The desired pitch is expressed by the control data P(H) and P(L).

If the lower significant bit of the control data P(L) is selected to be zero, then it will be possible to avoid, irregularly selecting and removing the interpolation data. Thus, it is possible to obtain a reproduced sound of high quality which is free from very small vibration in pitch.

When the switch $S_{2a}$ is closed by the control data FMON from the terminal 35*a*, then the audio signal data of, for example, voice #H, supplied to the terminal 34*a*, is added to the pitch control data P(H) and P(L), whereby the audio signal of voice #A is frequency-modulated (FM).

Thus, if the modulation signal has a very low frequency of, for example, several hertz, then the modulated signal will be given vibrato. If the modulation signal has an audible or low frequency, then the tone quality of the reproduced sound of the modulated signal will be changed. Therefore, an FM sound source is provided by the sampler system without providing a sound source exclusively for modulation. The control data FMON is written in the register of 8 bits similarly to the afore-mentioned data KON, and the respective bits $D_0$ to $D_7$ thereof correspond to the voices #A to #H.

In the multiplier 26, the level of the output signal of the pitch converting circuit 23 is controlled in time on the basis of the control data ENV on ADSR. More specifically, when the MSB of the control data ADSR is "1", then the switch $S_{3a}$ is connected in the illustrated state in FIG. 2, thereby performing the ADSR control. Whereas, when the MSB of the control data ADSR is "0", then the switch $S_{3a}$ is connected in the opposite state in FIG. 2, and envelope control such as fading and the like is performed.

For the envelope control, 5 modes such as direct designation, straight line or polygonal line fade-in and straight line or exponential fade-out can be selected by the upper 3 bits of the control data ENV. In that case, the present peak value is employed as the initial value of each mode.

In the ADSR control, the signal level is, rectilinearly increased only in the attack period and is exponentially decreased in the three periods such as decay period, sustain period and release period.

The durations of the fade-in period and fade-out period are properly determined for each mode in response to parameter values designated by the lower 5 bits of the control data ENV.

Similarly, the durations of the attack period and the sustain period are determined in response to parameter values designated by the upper and lower 4 bits of the control data ADSR(2). Further, the sustain level and the durations of the decay period and the release period are determined in response to parameter values designated by 2 bits each of the control data ADSR(1).

In this embodiment, in order to reduce the number of computations, the signal level is rectilinearly increased in the attack period of the ADSR mode. Alternatively, the ADSR mode is switched to the envelope mode, the polygonal line fade-in mode is made corresponding to the attack period and the exponential fade-out mode is made corresponding to the decay period, the sustain period and the release period, whereby the ADSR control can be manually performed more naturally.

When the signal output of the multiplier 26 and the envelope control input are supplied from the terminals 41*a* and 42*a* to the register RAM 12, and are rewritten at every sampling period and then a plurality of audio signals each having very different pitches are generated from the sound source data of, for example, the same musical instrument, it becomes possible to obtain an audio signal of desired envelope characteristic different from the predetermined ADSR pattern.

In the signal processing sections 50L and 50R of FIG. 3, the switches $S_{4a}$, $S_{5a}$; to $S_{4h}$, $S_{5h}$ are each closed by the control data EON ($EON_a$ to $EON_h$) from the terminals 61*a* to 61*h*, thus allowing selection of the voices to be reverberated. The control data EON are written in the 8-bit register as shown in the afore-mentioned table 2.

The delay times of echoes given to the respective voices from the sub-adder 51*el* are designated to be equal in the left and right channels in a range of from, for example, 0 to 250 milliseconds by the control data EDL supplied to the echo control portion 14El from the terminal 64. Further, the amplitude ratio of the preceding and succeeding echoes is determined to be equal in phase in the left and right channels by the control data EFB of the coded 8 bits supplied to the multiplier 57 from the terminal 67.

The control data ESA from the terminal 63 provides the upper 8 bits of the starting address of the portion used to control the echo reverberation) in the external RAM 14.

The FIR filter 56 is supplied with the coefficients $C_0$ to $C_7$ of the coded 8 bits from the terminal 66, whereby the pass-band characteristic of the FIR filter 56 is determined so as to provide a natural echo sound from an auditory sense standpoint.

The echo signal thus obtained is supplied to the multiplier 58, in which it is multiplied with the control data EVL from the terminal 68. Then, the multiplied echo signal is supplied to the adder 53, in which it is added with the main audio signal which is multiplied with the control data MVL by the multiplier 52. The control data MVL and EVL are 8 bits without codes and are mutually independent from each other. They are also independent in respect to the left and right channels.

Therefore, the main audio signal and the echo signal can be independently level-controlled, whereby a reproduced sound field is given full of presence as if the listeners were in the original acoustic space.

According to the electronic musical instrument of this embodiment, the non-interval component as the formant component is signal-processed by the signal processing section 20A of the voice #A and the interval component is signal-processed by any one of the vacant signal processing sections 20B to 20H of the voices #B to #H, whereby the sound of a musical instrument can be performed excellently by the sampler sound source including the non-interval component of seven overlapped sounds in 8 voices at maximum. Consequently, as compared with the case where 2 voices of the non-interval component and the interval component are assigned to each sound, much more multiplexed sound can be reproduced by the use of less voices.

Further, according to this embodiment, when the reverberation sound adding processing is performed by the signal processing sections 50L and 50R, the digital audio signal is delayed by the use of the vacant area of the external RAM 14 which is used to store sound source data. Therefore, the external RAM 14 is more effectively utilized and there is no need for a RAM exclusively used for delaying the digital audio signal. Therefore, the audio signal generating apparatus of this embodiment can be produced with fewer memories and the circuit arrangement thereof can be simplified.

Figure 7:
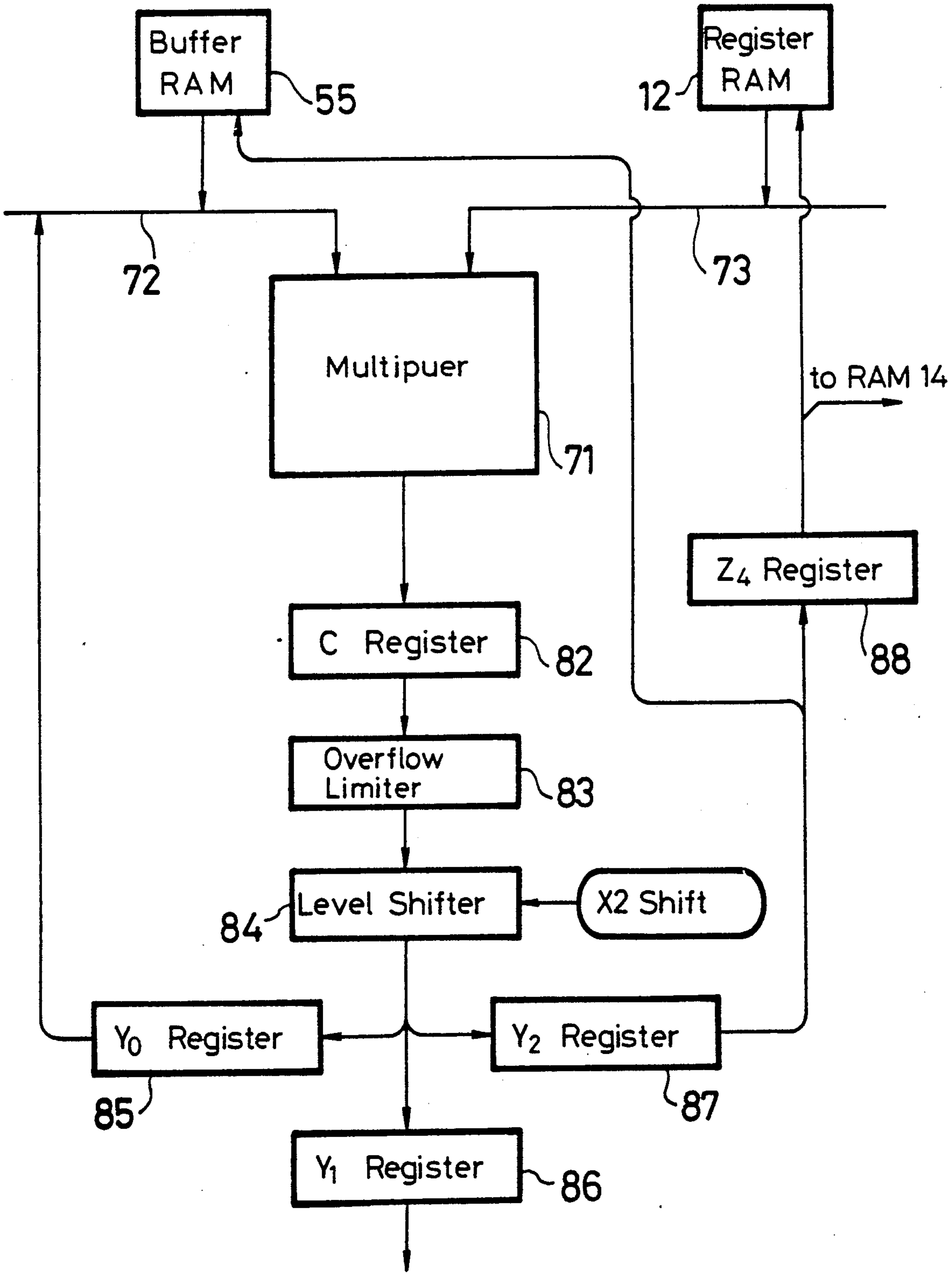
FIG. 7 is a block diagram showing a main portion of an arrangement of a computing section which is used to add a reverberation sound to a digital audio signal.

It is to be noted that the required storage capacity, which can be dictated by the requirements of the delay-processing echo control sections 14El and 14Er, is reduced in accordance with the increase of the storage capacity of the sound source data storage section 14V. This disadvantage can be removed by considering that the total storage capacity of the sound source data storage section 14V and the echo control sections 14El and 14Er may not exceed the total storage capacity of the external RAM 14 when musical software to be stored in the sound source ROM 1 is manufactured. FIG. 7 shows the arrangement of the computing section associated with the adding process of echo. In FIG. 7, like parts corresponding to those of FIGS. 3 and 4 are marked with the same references and therefore need not be described in detail.

Referring to FIG. 7, there is shown a multiplier 71 which is supplied with outputs of the buffer RAM 55 and a $Y_0$ register 85 through a bus line 72. This multiplier 71 is also supplied with the output of the register RAM 12 through a bus line 73. The output of the multiplier 71 is supplied to a C register 82, and the output of the C register 82 is commonly supplied through an overflow limiter 83 and a level shifter 84 to the $Y_0$ register 85, a $Y_1$ register 86 and a $Y_2$ register 87. The output of the register 85 is supplied through the bus line 72 to the multiplier 71 as described above. The output of the register 86 is delivered to the outside. The output of the register 87 is supplied to the buffer RAM 55, and is also commonly supplied through a $Z_4$ register 88 to the register RAM 12 and the external RAM 14.

The operation of the main portion shown in FIG. 7 will be explained below.

When the sound volume of the left channel of, for example, voice #A is controlled, a left sound volume control coefficient [LVL] from the register RAM 12 and signal data xe from the $Y_0$ register 85 are multiplied with each other by the multiplier 71. When the sound volume of the right channel is controlled, a right sound volume control coefficient [RVL] from the register RAM 12 and signal data xe from the $Y_0$ register 85 are multiplied with each other by the multiplier 71.

The computing sequences are expressed by the following equations (3) and (4)

$$xe \cdot [LVL] + x_{Li-1} \rightarrow x_{Li} \quad (3)$$

$$xe \cdot [RVL] + x_{ri-1} \rightarrow x_{Ri} \quad (4)$$

For other voices ##B to #H, the sound volumes of the left and right channels are controlled similarly as described above.

According to this embodiment, the following computation is further performed in order to add the reverberation sound to the digital audio signal.

When the main sound volumes of the left and right channels are controlled, the main sound volume control coefficient [MVL] from the register RAM 12 and the signal data $x_L$ and $x_R$, expressed by the equations (3) and (4) and derived from the $Y_0$ register 85, are multiplied by the multiplier 71. The resulting multiplied result is temporarily stored in the register 82.

When on the other hand the sub-sound volumes of the left and right channels are controlled, the audio data $x_{LE}$ and $x_{RE}$ of the voices to be selectively added with echoes are processed by the low-pass filter as described hereinbefore. Then, the thus processed audio data $y_{LF}$ and $y_{RF}$ are respectively multiplied with an echo feedback coefficient [EFB], added with the selected audio data $x_{LE}$ and $x_{RE}$ and are then fed to the external memories 14El and 14Er, respectively.

Then, the audio data $y_{LF}$ and $y_{RF}$ thus processed by the low-pass filter are multiplied with the echo sound volume control coefficient EVL) and are added with the afore-mentioned main sound volume data.

The computations as described above are expressed by the following equations (5) and (8).

$$y_{LF} \cdot [EFB] + x_{LE} \rightarrow y_{LE} \quad (5)$$

$$\left. \begin{array}{l} x_L \cdot [MVL] \rightarrow C \\ y_{LF} \cdot [EVL] + C \rightarrow Z_{7L} \end{array} \right\} \quad (6)$$

-continued $$y_{RF} \cdot [EFB] + x_{RE} \rightarrow y_{RE} \quad (7)$$

$$\left.\begin{array}{l} x_R \cdot [MVL] \rightarrow C \\ y_{RF} \cdot [EVL] + C \rightarrow Z_{7R} \end{array}\right\} \quad (8)$$

The results computed by the equations (6) and (8) are supplied to in the buffer RAM 55 via the register 87 and stored therein.

While the present invention is applied to the sample sound source as described above, it is needless to say that the present invention can be suitably applied to desired sound sources.

As described above in detail, the echo signal delay area is provided in the vacant area of the memory in which the sound source data are stored and there is provided means for inhibiting the provision of the delay area, whereby the delay area can be prevented from being inadvertently provided in the memory at its area in which the sound source data are written. Thus, the memory exclusively for echo signal becomes unnecessary and the digital audio signal generating apparatus can be provided, which can stably and positively effect the reverberation.

Figure 8:
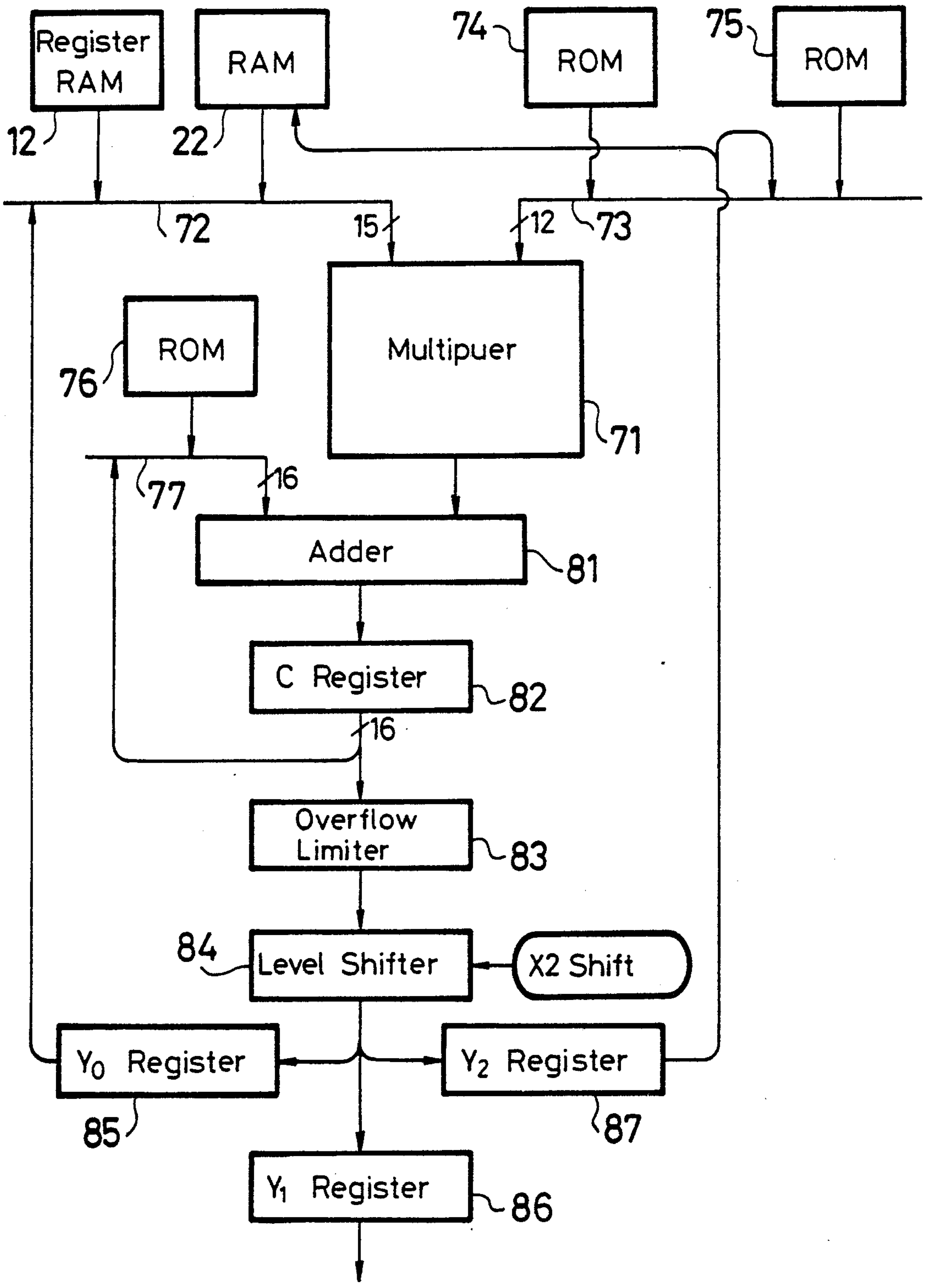
FIG. 8 is a block diagram showing a main portion of an arrangement of a computing section which is associated with the frequency-modulation.

A schematic block diagram forming FIG. 8 shows an arrangement of the computing section associated with the frequency modulation (FM). In FIG. 8, like parts corresponding to those of FIG. 7 are marked with the same references and therefore need not be described in detail.

In FIG. 8, it will be seen that the multiplier 71 is supplied with the outputs of the register RAM 12 and the buffer RAM 22 through the bus line 72. This multiplier 71 is also supplied with outputs of ROMs 74 and 75 through the bus line 73. An output of a ROM 76 is supplied through a bus line 77 to an adder 81, and the output of the multiplier 71 is supplied to the adder 81. The output of the adder 81 is supplied to the C register 82. The output of the C register 82 is supplied through the bus line 77 to the adder 81, and is also commonly supplied through the overflow limiter 83 and the level shifter 84 to the $Y_0$ register 85, the $Y_1$ register 86 and $Y_2$ register 87. The outputs of the registers 85 and 87 are supplied to the multiplier 71 via the bus lines 72 and 73, respectively, and the output of the register 86 is fed to the outside.

The operation of the main portion shown in FIG. 8 will be explained below.

In the case of frequency modulation, assuming that $y_0$ is the instantaneous value (OUTX) of the audio signal of preceding example, voice #H, P is the value of pitch indicated by the P(H) and P(L) registers and that Pm is the value of pitch indicated after the frequency modulation, then the computation for frequency modulation will be expressed by the following equation (9)

$$Pm = P(1 + y_0) \quad (9)$$

Further, assuming that SL is the pitch data (slot value) on the RAM 22, then a pitch data (slot value) of the next sampling period will be expressed by the following equation (10)

$$SLm = SL + Pm \quad (10)$$

The resultant SLm is used to generate address data of the RAM 22 and the ROM 76 for pitch conversion computation, thereby generating the input data of the pitch converting circuit 23 and its pitch conversion filter coefficient.

In practice, the computing sequences are as follows. In the case of FMON, a coefficient [½] is generated from the ROM 74, and this coefficient [½] is multiplied with the instantaneous value $y_0$ of the signal of voice #H from the $Y_0$ register 85 by the multiplier 71. The multiplied result and the constant [½] from the ROM 76 are added to each other by the adder 81, whereby an intermediate value expressed by the following equation (11) is written in the $Y_2$ register 87 via the C register 82.

$$y_0 \times \tfrac{1}{2} + \tfrac{1}{2} \rightarrow (1 + y_0)/2 \quad (11)$$

Then, this intermediate value and the pitch value P from the register RAM 12 are multiplied with each other by the multiplier 71. The multiplied result and the constant [0] from the ROM 76 are added to each other by the adder 81, and the computed value expressed by the following equation (12) is written in the C register 82.

$$P \times (1 + y_0)/2 + 0 \rightarrow Pm/2 \quad (12)$$

Further, the slot value SL on the RAM 22 and the coefficient [½] from the ROM 74 are multiplied with each other by the multiplier 71. The multiplied result and the computed value, expressed by the equation (12) and supplied through the bus line 77 from the register 82, are added to each other by the adder 81, and the added result is supplied through the register 82 and the like to the level shifter 84. This level shifter 84 performs the level-shifting operation of ×2, thereby supplying an output, expressed by the following equation (13), through the register 87 to the RAM 22.

$$(SL \times \tfrac{1}{2} + Pm/2) \times 2 \rightarrow SLm \quad (13)$$

Figure 9A:
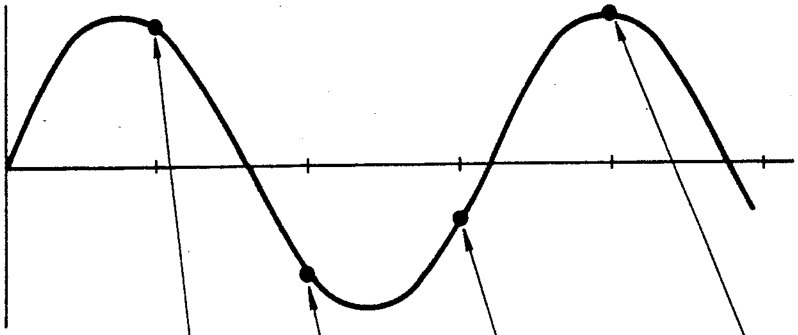
FIGS. 9A-9C are waveform representations to which reference will be made in explaining the operation of the computing section of FIG. 8, respectively.
Figure 9B:
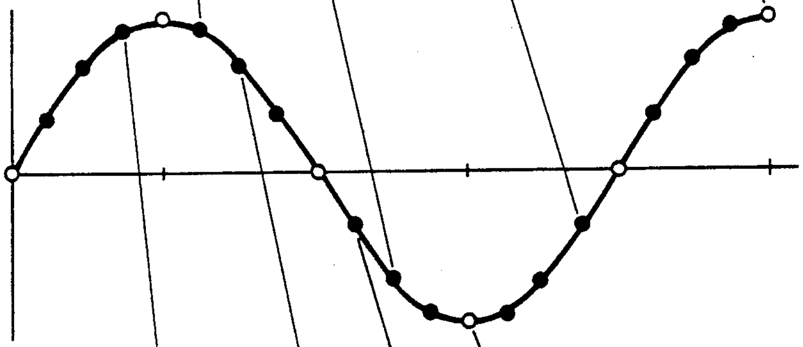
Figure 9C:
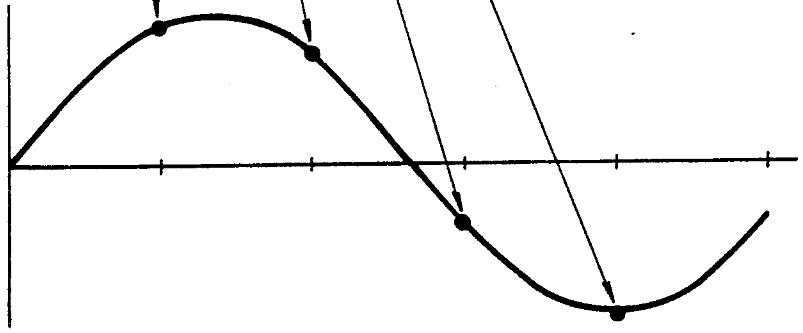

If the instantaneous value $y_0$ of the modulation signal is greater than 0 ($y_0 > 0$) for the modulated signal as shown in FIG. 9B, then the instantaneous frequency will be increased as shown in FIG. 9A. If the instantaneous value $y_0$ is less than 0 ($y_0 < 0$), then the instantaneous frequency will be decreased as shown in FIG. 9C. A similar operation is performed in the case of amplitude modulation instead of frequency modulation.

As described above, one output of the plurality of pitch converting means or an amplitude control means is supplied to other pitch converting means or amplitude control means as the control signal so as to obtain the digital audio signal thus frequency-modulated or amplitude-modulated. Thus, a signal source, exclusively used for modulation, becomes unnecessary so that the digital audio signal generating apparatus of this embodiment can be simplified in construction.

Figure 10:
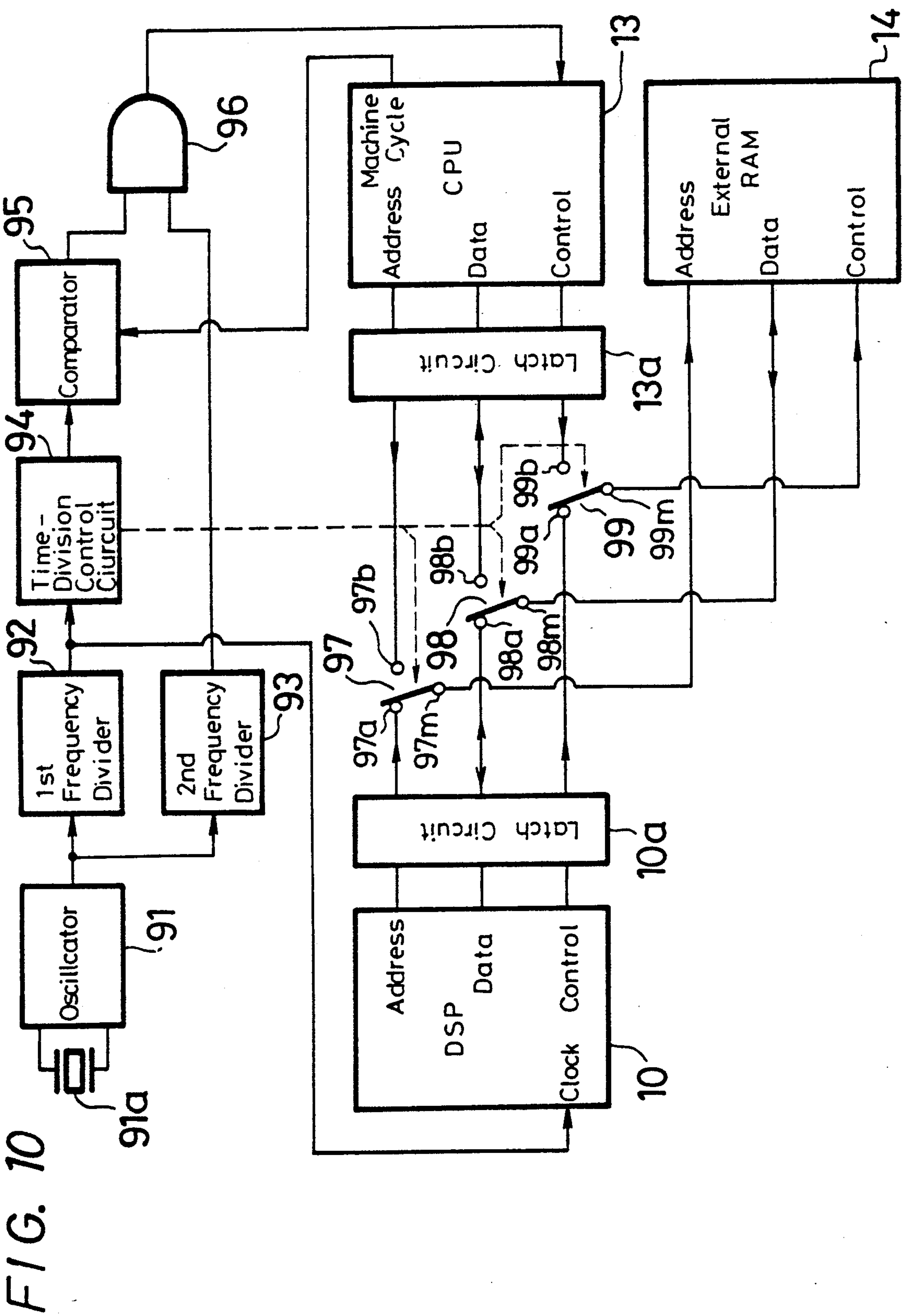
FIG. 10 is a block diagram showing an example of a synchronizing circuit used in the present invention.

FIG. 10 shows an example of a synchronizing circuit, by which the digital signal processing apparatus (DSP) 10 and the central processing unit (CPU) 13 can write data in and/or read data from the external RAM 14 in a time-division manner.

In this embodiment, as shown in FIG. 10, respective address, data and control bus lines of the DSP 10 and the CPU 13 are connected to the external RAM 14 via latch circuits 10*a* and 13*a* and switches 97, 98 and 99. More specifically, an address bus line, data bus line and control bus line of the DSP 10 are connected through the latch circuit 10*a* to first fixed contacts 97*a*, 98*a* and 99*a* of the bus line change-over switches 97, 98 and 99. Address bus line, data bus line and control bus line of the CPU 13 are connected through the latch circuit 13*a* to second fixed contacts 97*b*, 98*b* and 99*b* of the change-over switches 97, 98 and 99, respectively. Movable contacts 97*m*, 98*m* and 99*m* of these switches 97, 98 and 99 are connected to address bus line, data bus line and control bus line of the external RAM 14, respectively.

A frequency signal from an oscillator 91 connected with a quartz oscillator 91*a* is supplied to first and second frequency dividers 92 and 93. A frequency-divided signal from the first frequency divider 92 is supplied to the DSP 10 as a clock signal and is also supplied to a time-division control circuit 94 as a control clock signal. The switches 97, 98 and 99 are changed in position in response to a switching control signal derived from the time-division control circuit 94.

A time-division signal from the time-division control circuit 94 is supplied to one input terminal of a comparator 95 and a machine cycle signal from the CPU 13 is supplied to the other input terminal of the comparator 95. The comparator 95 detects a phase difference between the switching timing of the switches 97 to 99 and the machine cycle of the CPU 13, and supplies its coincidence detected signal to one input terminal of an AND gate 96. A frequency-divided signal from the second frequency divider 93 is supplied to the other input terminal of the AND gate 96. An output signal of the AND gate 96 is supplied to the CPU 13 as a clock signal.

The operation of the synchronizing circuit of FIG. 10 will be explained with reference to timing charts forming FIGS. 11A to 11D.

Let it be assumed that a clock signal (FIG. 11A), which results from frequency-dividing the frequency signal of the oscillator 91 by the first frequency divider 92, is supplied to the DSP 10. Then, the output signal of the first frequency divider 92 is supplied to the time-division control circuit 94, and this time-division control circuit 94 carries out such a time-division-control that 8 periods of the output signal from the first frequency divider 92 are taken as one period. Consequently, the time-division control circuit 94 generates as a time-division signal a signal which, as shown in FIG. 11B repeatedly goes to high level and low level at every 4 periods of the clock signal of the DSP 10.

The frequency-dividing ratio of the second frequency divider 93 is selected to be four times the frequency-dividing ratio of the first frequency divider 92, whereby the second frequency divider 93 generates a frequency signal having a frequency of ¼ of that of the clock signal from the DSP 10. This frequency signal is supplied to the CPU 13 as a clock signal as shown in FIG. 11C. In that event, the machine cycle of the CPU 13 becomes a signal which changes in synchronism with the time-division signal as shown in FIG. 11D. When the power switch of the digital audio signal generating apparatus is turned ON and so on, if the comparator 95 detects that the time-division signal and the machine cycle signal are inverted in phase, then the coincidence detected signal is not supplied to the AND gate 96 so that no clock signal is supplied to the CPU 13 from the AND gate 96 any more. In other words, the clock signal (FIG. 11C) of the CPU 13 loses its pulse shown by a broken line because the time-division signal and the machine cycle signal are different in phase. Thus, the machine cycle is moved by a half cycle and is placed in a normal condition.

Further, the operation in which data is written in and/or read out of the external RAM 14 by the DSP 10 and the CPU 13 in a time-division manner will be explained with reference to FIGS. 12A to 12G.

In this embodiment, one access time of the external RAM 14 is selected to be about 330 nanoseconds and one memory access time of the DSP 10 is selected to be about 240 nanoseconds. Further, one machine cycle of the CPU 13 is selected to be about one microsecond and about 375 nanoseconds in one machine cycle are employed as one memory access time.

Let it be assumed that the above-mentioned synchronizing circuit of FIG. 10 generates the clock signal of the DSP 10, the clock signal of the CPU 13 and the time-division signal in the normal states as shown in FIGS. 12A, 12B and 12C. Then, in that event, each memory access period Mc of the CPU 13 is provided in the second half portion of one machine cycle S as shown in FIG. 12D. Then, as shown in FIG. 12E, two memory access periods $M_{D1}$ and $M_{D2}$ of the DSP 10 are provided in the first half portion of one machine cycle S.

On the other hand, one access time of the external RAM 14 is about 330 nanoseconds so that, as shown in FIG. 12G, three access periods $M_{D1}'$, $M_{D2}'$ and $M_C'$ each having equal intervals are provided in one machine cycle S as shown in FIG. 12G.

While the access periods of the DSP 10, CPU 13 and the external RAM 14 are not coincident as described above, according to this embodiment, the above-mentioned displacement of the access periods can be properly adjusted by the switching control of the switches 97 to 99 by the time-division control circuit 94 and the latch operations of the latch circuits 10*a* and 13*a*. To be more concrete, the time-division control circuit 94 generates such a switching control signal shown in FIG. 12F that on the basis of the time-division signal shown in FIG. 12C, the movable contacts 97*m*, 98*m* and 99*m* of the switches 97, 98 and 99 are connected to the first fixed contacts 97*a*, 98*a* and 99*a* during the first access period $M_{D1}'$ and the second access period $M_{D2}'$ of the external RAM 14 and that the movable contacts 97*m*,98*m* and 99*m* of the switches 97, 98 and 99 are connected to the second fixed contacts 97*b*, 98*b* and 99*b* during the third access period $M_C'$. The latch circuit 10*a* connected to the DSP 10 holds the signals supplied through the bus lines during the first access period $M_{D1}$ of the DSP 10 until the first access period $M_{D1}'$ of the external RAM 14 is ended, and also holds the signals supplied through the bus lines during the second access period $M_{D2}$ of the DSP 10 until the second access period $M_{D2}'$ of the external RAM 14 is ended. In a like manner, the latch circuit 13*a* connected to the CPU 13 holds the signals supplied through the bus lines during the access period $M_C$ of the CPU 13 until the third access period $M_C'$ of the external RAM 14 is ended. The latch operations of the latch circuits 10*a* and 13*a* are controlled by, for example, the CPU 13.

As described above, the DSP 10 and the CPU 13 can share the single external RAM 14 in a time-division manner, whereby the external RAM 14 can be utilized more effectively. Thus, the external RAM 14 for processing the data of the DSP 10 and the CPU 13 can be constructed using fewer memories. Further, the different access periods of the DSP 10 and the CPU 13 are adjusted to be equal and in this embodiment, one accessing is performed at every period of about 330 nanoseconds. Therefore, a memory apparatus of relatively low accessing speed, which can be relatively inexpensive, can be employed as the external RAM 14.

While the above-mentioned embodiment utilizes the combination of a DSP 10 of relatively high accessing speed and a CPU 13 relatively low accessing speed, this invention is not limited to the above-mentioned combination and the access periods can be properly adjusted in accordance with the access speed of the combination of the data executing means and the memory.

Furthermore, according to the digital audio signal generating apparatus of this embodiment, since one external memory is commonly utilized by two sets of data executing means, the memory can be utilized more effectively and the memory can be saved.

Having described preferred embodiments of the invention in detail with reference to the accompanying drawings, it is to be understood that the present invention is not limited to those precise embodiments and that many changes and modifications could be effected by one skilled in the art without departing from the spirit and scope of the novel concepts of the invention as defined in the appended claims.

We claim as our invention:

1. An apparatus for generating a digital audio signal comprising:

memory means for storing a digital audio signal;

control means for controlling a reading the digital audio signal from the memory means;

signal processing means for performing a predetermined processing, including reverberation processing, of the digital audio signal read by the control means;

temporary memory means used by both the control means and the signal processing means; and means for setting a delay area in vacant areas of the temporary memory means so as to perform a delay processing when a reverberation sound is added to the digital audio signal processed by the signal processing means.

2. An apparatus for generating a digital audio signal according to claim 1, further comprising means for inhibiting an operation of the delay area setting means, wherein the vacant area can be prevented from being inadvertently provided in the temporary memory means.

3. An apparatus for generating a digital audio signal according to claim 1, in which a plurality of digital audio signals read from the memory means are separately processed through a plurality of pitch converting means, comprising means for supplying the output of one of the pitch converting means to another pitch converting means as a control signal, wherein a frequency-modulated digital audio signal is generated from the other pitch converting means.

4. An apparatus for generating a digital audio signal according to claim 1, and wherein the signal processing means has a first execution cycle to execute its operations and for writing in and reading out data from the temporary memory means;

the control means has a second execution cycle different from the first execution cycle to execute its operation and for writing in and reading out data from the temporary memory means; and further comprising:

selecting means for selectively connecting one of the signal processing means or the control means to the temporary memory means so that data is written in and/or read from the temporary memory means by one of the signal processing means or the control means;

selecting control means for controlling the selecting means so that data can be written in and/or read from the temporary memory means by the control means during a non-access period in which data is not written in and/or read from the temporary memory means by the signal processing means; and holding means provided between the control means and the temporary memory means for holding data so that a period in which the control means writes in and/or reads data from temporary memory means substantially coincides with the non-access period.

* * * * *